United States Patent
Wood, II (10) Patent No.: US 6,408,778 B1
(45) Date of Patent: Jun. 25, 2002

(54) WATERCRAFT RETRIEVER LIFT

(75) Inventor: Donald M. Wood, II, Stuart, FL (US)

(73) Assignee: Hi-Tide Sales, Inc., Fort Pierce, FL (US)

( * ) Notice: Subject to any disclaimer, the term of this patent is extended or adjusted under 35 U.S.C. 154(b) by 0 days.

(21) Appl. No.: 09/643,461

(22) Filed: Aug. 22, 2000

(51) Int. Cl.$^7$ ............................................. B63B 25/16
(52) U.S. Cl. ..................................... 114/230.22; 405/1
(58) Field of Search ........................... 280/414.1; 405/1, 405/2; 114/230.22, 230.23, 230.24, 344; 104/183

(56) References Cited

U.S. PATENT DOCUMENTS

| | | | |
|---|---|---|---|
| 1,613,155 A | 1/1927 | Berg | |
| 2,484,346 A | 10/1949 | Lorns | |
| 2,551,040 A | 5/1951 | Newell | |
| 2,578,376 A | 12/1951 | Smith | |
| 2,620,610 A | 12/1952 | Chambers | |
| 2,684,040 A | * 7/1954 | Talboys | ............ 104/183 |
| 2,966,368 A | 12/1960 | Engnell | |
| 2,978,257 A | 4/1961 | Barker | |
| 3,123,378 A | 3/1964 | Caldwell | |
| 3,271,798 A | 9/1966 | Zoretic | |
| 3,284,821 A | 11/1966 | Zoretic | |
| 3,301,571 A | 1/1967 | Malcolm | |
| 3,416,813 A | 12/1968 | Sholl | |
| 3,437,315 A | * 4/1969 | McDonald, Jr. | ............ 104/183 |
| 3,612,566 A | 10/1971 | Sholl | |
| 3,659,868 A | 5/1972 | Tucker | |
| 3,663,040 A | * 5/1972 | Weaver et al. | ............ 280/414.1 |
| 3,665,533 A | 5/1972 | Kleinau | |
| 3,671,056 A | 6/1972 | Windemuth | |
| 3,687,476 A | 8/1972 | Abbott | |
| 3,697,096 A | 10/1972 | Hadley | |
| 3,771,809 A | 11/1973 | Carn | |
| 3,857,128 A | 12/1974 | Gilster | |
| 4,127,281 A | 11/1978 | Ferguson | |
| 4,235,450 A | 11/1980 | Conover | |
| 4,268,211 A | * 5/1981 | Schwebke | ............ 280/414.1 |
| 4,440,409 A | 4/1984 | Margison | |
| 4,465,291 A | 8/1984 | Voylie et al. | |
| 4,550,925 A | 11/1985 | McDonough | |
| 4,601,481 A | 7/1986 | Maurice | |
| 4,671,774 A | * 6/1987 | Owsen | ............ 440/95 |
| 4,801,152 A | 1/1989 | Elliott et al. | |
| 4,850,605 A | 7/1989 | Ray | |
| 5,000,468 A | 3/1991 | Weinstein | |
| 5,176,394 A | 1/1993 | Veazey | |
| 5,234,285 A | * 8/1993 | Cameron | ............ 405/2 |
| 5,755,451 A | 5/1998 | O'Connor | |
| 5,941,544 A | 8/1999 | Fiedler | |
| 5,941,675 A | 8/1999 | Orr | |
| 6,223,660 B1 | * 5/2001 | Wolf | ............ 104/183 |

* cited by examiner

Primary Examiner—Sherman Basinger
(74) Attorney, Agent, or Firm—Sperry, Zoda & Kane (57) ABSTRACT

A boat lift construction is disclosed for retrieving watercraft from one location and moving them to another location by use of a fixed longitudinal member operatively connected to a winch which moves a carrier frame mounted on wheels back and forth between a first position on land and a second position normally in a lake or river or ocean immediately thereadjacent. This boat lift includes an articulated mounting system for the wheels to facilitate continual contact thereof with respect to the ground during overland movement. The wheels are at least partially hydraulic in order to keep the wheels in contact with the ground surface even when moving in an area below the water line which allows the carrier to move along the overland bottom surface underneath the water line as well as along the ground line immediately thereadjacent.

25 Claims, 4 Drawing Sheets

WATERCRAFT RETRIEVER LIFT

BACKGROUND OF THE INVENTION

1. Field of the Invention

The present invention deals with the field of automated boat lifts or lifts for various watercraft including amphibious aircraft. Such watercraft are commonly removed from water by moving vertically or horizontally to a position of dry dock. The present invention is designed specifically for moving of a watercraft horizontally from a first position in dry dock adjacent to a lake or river to a second position wherein the boat is movable into the water. The ground line upon which the articulated locomotion system is designed to move on the land in the area above the water line and to move on the bottom contour of the river or lake which can be optionally possible by selective weighting of pneumatic and/or hydraulic tires to facilitate such overlay and movement.

2. Description of the Prior Art

Numerous devices have been patented for the movement of boats horizontally, vertically or at an angle to and from a position of dry dock and to and from a position water-born. Examples of such patents are shown in U.S. Pat. No. 1,613,155 patented Jan. 4, 1927 to A. C. Berg on a "Wheeled Supporting Device"; and U.S. Pat. No. 2,484,346 patented Oct. 11, 1949 to M. E. Iorns on a "Wheel Support And Carrier Attachment For Transporting Boats"; and U.S. Pat. No. 2,551,040 patented May 1, 1951 to F. T. Newell on a "Wheeled Attachment For Transporting Boats"; and U.S. Pat. No. 2,578;376 patented Dec. 11, 1951 to A. Smith on a "Wheeled Attachment For Boats"; and U.S. Pat. No. 2,620,610 patented Dec. 9, 1952 to J. M. Chambers and assigned to Harry Ferguson, Ltd. on a "Transport Apparatus For Tandem-Harrows"; and U.S. Pat. No. 2,966,368 patented Dec. 27, 1960 to K. O. Engnell on a "Wheeled Support For Boats"; and U.S. Pat. No. 2,978,257 patented Apr. 4, 1961 to B. A. Barker on a "Boat Carrier"; and U.S. Pat. No. 3,123,378 patented Mar. 3, 1964 to E. V. Caldwell on a "Wheel Suspension Assembly"; and U.S. Pat. No. 3,271,798 patented Sep. 13, 1966 to M. A. Zoretic on a "Device For Launching, Landing And Portaging A Boat"; and U.S. Pat. No. 3,284,821 patented Nov. 15, 1966 to M. A. Zoretic on a "Wheel Assembly For A Boat"; and U.S. Pat. No. 3,301,571 patented Jan. 31, 1967 to W. W. Malcolm on a "Quick Attachable And Detachable Wheel Means For A Boat"; and U.S. Pat. No. 3,416,813 patented Dec. 17, 1968 to C. R. Sholl on "Removable Wheels For Boats"; and U.S. Pat. No. 3,612,566 patented Oct. 12, 1971 to C. R. Sholl on a "Removable Support Wheel Assembly"; and U.S. Pat. No. 3,671,056 patented Jun. 20, 1972 to K. C. Windemuth on a "Boat Transport Device"; and U.S. Pat. No. 3,659,868 patented May 2, 1972 to E. Tucker and assigned to Dean Sandford on "Detachable Wheels For Boats"; and U. S. Pat. No. 3,665,533 patented May 30, 1972 to W. W. Kleinau on a "Water Craft Launching And Removal Means"; and U.S. Pat. No. 3,687,476 patented Aug. 29, 1972 to R. M. Abbott on a "Removable Dolly Wheel For Boat"; and U.S. Pat. No. 3,697,096 patented Oct. 10, 1972 to F. H. Hadley on a "Boat Handling Apparatus"; and U.S. Pat. No. 3,771,809 patented Nov. 13, 1973 to P. Carn on a "Device For Transporting Loads On Uneven Or Shifting Ground, And Also For Launching Small Boats"; and U.S. Pat. No. 3,857,128 patented Dec. 31, 1974 to W. J. Gilster on a "Wheeled Carrier For Sailing Vessel"; and U.S. Pat. No. 4,127,281 patented Nov. 28, 1978 to R. A. Ferguson on a "Boat Roller"; and U.S. Pat. No. 4,235,450 patented Nov. 25, 1980 to C. G. Conover on "Catamaran Boat Dollies"; and U.S. Pat. No. 4,440,409 patented Apr. 3, 1984 to A. B. Margison on a "Boat Transporter"; and U.S. Pat. No. 4,465,291 patented Aug. 14, 1984 to E. T. Wylie et al on a "Boat Launching Dolly"; and U.S. Pat. No. 4,550,925 patented Nov. 5, 1985 to S. L. McDonough on a "Boat Dolly"; and U. S. Pat. No. 4,601,481 patented Jul. 22, 1986 to G. E. Maurice on a "Portable Boat Dolly"; and U.S. Pat. No. 4,801,152 patented Jan. 31, 1989 to J. H Elliott et al on a "Boat Dolly"; and U.S. Pat. No. 4,850,605 patented Jul. 25, 1989 to J. R. Ray on a "Boat Dolly"; and U.S. Pat. No. 5,000,468 patented Mar. 19, 1991 to B. Weinstein on a "Boat Dolly"; and U.S. Pat. No. 5,176,394 patented Jan. 5, 1993 to S. E. Veazey on a "Towing Rig For Floating Objects"; and U.S. Pat. No. 5,755,451 patented May 26, 1998 to M. A. O'Connor on a "Boat Portage Dolly"; and U.S. Pat. No. 5,941,544 patented Aug. 24, 1999 to M. D. Fiedler on a "Boat Transporting Device"; and U.S. Pat. No. 5,941,675 patented Aug. 24, 1999 to D. G. Orr and assigned to Magna Tech, Inc. on a "Tow Dolly".

SUMMARY OF THE INVENTION

The present invention provides a watercraft retriever lift adapted to move watercraft overland between a first deadman fixed member and a second deadman fixed member. Such deadmen fixed members can comprise any type of a pier, buoy, anchor or other member wherein the first deadman fixed member is secured to the land and a second deadman fixed member is secured to the bottom surface beneath the water line.

In this manner movement overland between a first position adjacent the first deadman fixed member and a second position adjacent the second deadman fixed member for the watercraft lift and any watercraft support thereupon is facilitated.

A carrier frame may be included for supporting of a watercraft thereon which facilitates movement thereof between the first and second positions. This carrier frame preferably includes a first end somewhat closer to the first deadman fixed member and a second end spatially disposed from the first end in the direction toward the second deadman member. In the preferred configuration the carrier frame can include one or preferably two bunk members extending longitudinally between the first end and the second end thereof spaced apart from one another to provide a type of a frame rail configuration running longitudinally for the carrier. Cross beam members will be included extending laterally between the bunk members to facilitate support of a watercraft thereon. Guide poles may also be included extending vertically with respect to the cross beam members to facilitate retaining of a watercraft thereon. Guide pole brackets may further be included which are adjustably mounted to the cross beam members and having the guide poles affixed thereto to extend vertically therefrom. The guide pole brackets are preferably adjustable laterally along the cross beam members to provide adjustment in lateral positioning thereof to facilitate retaining of variously sized watercraft.

Hull support members may be included in the carrier frame extending longitudinally or horizontally, that is, with respect to the cross beam members to facilitate abutment with and supporting of the hull of a watercraft positioned upon the carrier frame. Although the hull support members could be oriented transverse across the carrier frame, the preferred configuration of the hull support members is extending perpendicularly with respect to the cross beam members in an orientation extending approximately parallel with respect to the carrier frame. A bow stop may also be included adjacent the first end for abutment with the bow of a watercraft responsive to the positioning of such a watercraft upon the carrier frame means.

An articulated suspension apparatus may be included attached to the carrier frame to facilitate ease of movement thereof overland with a watercraft positioned thereupon. This articulated suspension means may be pivotally attached with respect to the cross beam members to facilitate support of the carrier frame and a watercraft positioned thereon. The articulating member will include preferably a first, second, third and fourth articulating member each of which is pivotally mounted with respect to the carrier frame to extend longitudinally therefrom. Each of these articulating arm members will be pivotally movable with respect to the carrier with an axis of rotation oriented laterally with respect to the carrier frame. A pair of axle members will be mounted on each of the articulating members and will be defined as the first, second, third and fourth axle members respectively. These axle members will extend laterally outwardly therefrom and will be spatially disposed from one another to facilitate support of the overall articulating construction.

A wheel means will be rotatably secured to the articulating suspension in order to facilitate movement of the carrier frame and the watercraft supported thereon overland. This wheel means may preferably include a tire which is at least partly hydraulic in order to define a ballast retaining chamber therein to selectively receive water as a weighted ballast in order to maintain contact between the tires and the earthen substrate when moving overland through water covered areas. In this manner the retriever lift of the present invention will sink to the bottom when moving a watercraft into a lake or river. A pair of wheels will be positioned rotatably mounted on each of the first through fourth axle members in order to facilitate movement of the carrier frame between a first position and a second position.

A continuous longitudinal member such as a cable or chain will be attached to the carrier frame and will be positioned extending between the first deadman pier member and the second deadman pier member to facilitate moving of the carrier between the first position and the second position. This continuous longitudinal member will be attached with respect to the first end of the carrier frame and will extend therefrom to attachment to the first deadman fixed member and will in turn extend therefrom to attachment with respect to the second deadman fixed member and finally will extend therefrom to attachment with respect to the second end of the carrier frame.

A winch may be operatively included attached to the continuous longitudinal member to urge longitudinal movement thereof to-cause movement of the carrier frame and any watercraft supported thereupon between the first position and the second position. This winch will preferably be fixedly secured to the first deadman fixed member or to the first end of the carrier frame in such a manner as to cause the retriever lift to move between the first position and the second position respectively. A tension adjustment apparatus may be positioned in longitudinal alignment with the continuous longitudinal cable or chain in order to facilitate adjusting of the longitudinal length and tightness thereof. Sheaves may also be included secured to the first or second deadman members or both as may be necessary depending upon the positioning of the winch.

It is an object of the present invention to provide a watercraft retriever lift which is adapted to move a watercraft overland between two positions.

It is an object of the present invention to provide a watercraft retriever lift which is adapted to move a watercraft overland between a body of water and an adjacent land position.

It is an object of the present invention to provide a watercraft retriever lift which is supported on the ground and river bottom by a plurality of articulated wheel assemblies.

It is an object of the present invention to provide a watercraft retriever lift which utilizes a minimum number of moving parts.

It is an object of the present invention to provide a watercraft retriever lift which requires a minimum initial capital cost outlay.

It is an object of the present invention to provide a watercraft retriever lift which is easy to maintain.

It is an object of the present invention to provide a watercraft retriever lift which can be continuously utilized with a minimum amount of down time.

It is an object of the present invention to provide a watercraft retriever lift which can support any type of watercraft.

It is an object of the present invention to provide a watercraft retriever lift which makes use of a winch positioned at variable locations depending on the particular application.

It is an object of the present invention to provide a watercraft retriever lift which can selectively include a bow stop against which the bow of a watercraft is placed in abutment for fixed mounting upon the carrier frame of the retriever lift.

It is an object of the present invention to provide a watercraft retriever lift which can include adjustable vertical guides to facilitate positioning of a watercraft upon the carrier frame.

It is an object of the present invention to provide a watercraft retriever lift which makes use of a longitudinally continuous member which can comprise a chain and/or cable means.

It is an object of the present invention to provide a watercraft retriever lift which can make use of an electric remote control device to facilitate remote operation thereof.

It is an object of the present invention to provide a watercraft retriever lift which can move a watercraft from an in-water position to a dry dock position and also facilitating return movement thereof.

It is an object of the present invention to provide a watercraft retriever lift which provides a ballast means for maintaining contact between the wheels and the river bottom or lake bottom surface.

It is an object of the present invention to provide a watercraft retriever lift which contains a ballast means for weighting thereof to be sure that the watercraft support mechanism travels upon the bottom surface of an adjacent river, lake or other body of water during use thereof.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a retriever lift 12 which is adapted to receive a watercraft 10 thereon to facilitate movement thereof. The retriever lift 12 is adapted to move the watercraft 10 through an overland area 14 between a first position 16 and a second position 18. Preferably the first position 16 will be a land area or dry dock position and the second position 18 will be in a body of water adjacent to the dry dock position such as a lake, river, ocean, canal or other area where such watercraft might be utilized. Conventional boat lifts are designed to lift the watercraft 10 vertically from the second position 12 within water for landing thereof or movement thereof to a dry dock position. The present invention provides a unique construction for a retriever lift 12 which is adapted to move a watercraft 10 through an overland area 14 between a first position 16 and a second position 18.

In the preferred configuration the second position 18 is in the water where the boat is being used. Adjacent the second position 18 a second deadman fixed member 22 will preferably be positioned affixed to the floor of the body of water in such a manner as to be affixed and provide a fixed point of connection. A similar fixed point of connection is provided by a first deadman fixed member 20 on the land side adjacent the dry dock position. These two fixed members will provide the fixed securement for facilitating movement of the retriever lift 12 between the first and second positions 16 and 18.

In the preferred configuration the retriever lift 12 includes a carrier frame 24 which can be of various particular constructions but will always include a first end 26 located on the land side of the retriever lift 12 closest to the first position 16. Retriever lift 12 will also include a second end 28 on the water side of the retriever lift 12 closest to the second deadman fixed member 22 and the second position 18.

Figure 2:
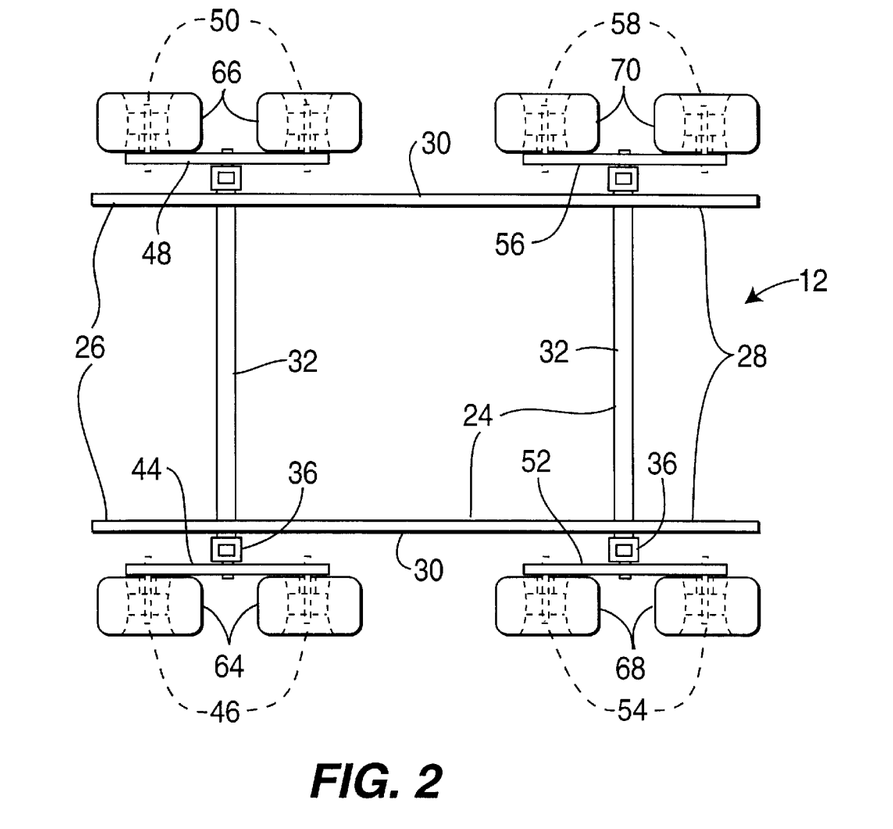
FIG. 2 is a top plan view of an embodiment of the retriever lift of the present invention showing an embodiment for the carrier frame and articulated suspension means.
Figure 3:
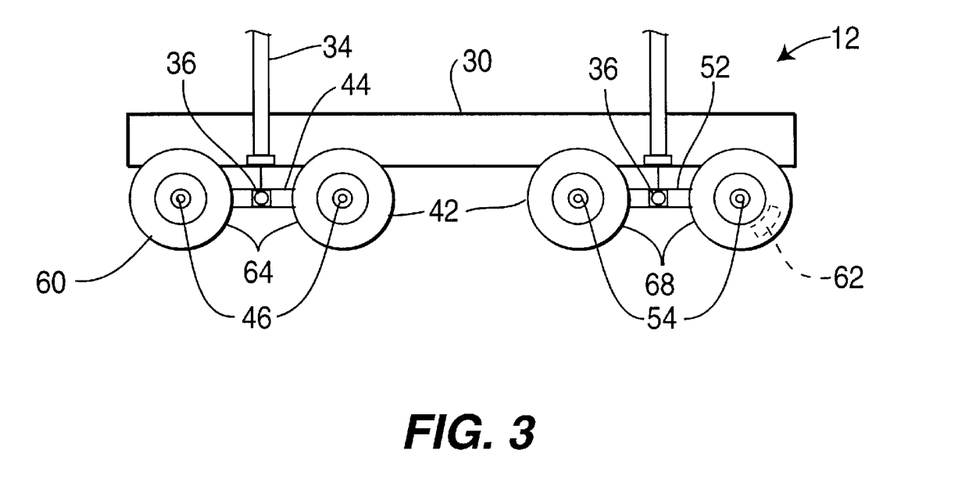
FIG. 3 is a side plan view of FIG. 2.

Carrier frame 24 will preferably include at least two bunk members 30 extending longitudinally therealong with cross members 32 extending laterally therealong to form a generally rectangular structure fixed in all directions. The cross beam members 32 will preferably extend laterally beyond the bunk members 30 in order to provide a means for supporting of the wheels thereon. The cross beam members preferably will include guide pole brackets 36 adjustably secured thereto with guide poles 34 extending vertically therefrom. The guide pole brackets 36 provide adjustability in positioning of the guide poles 34 laterally along the cross beam members 32 such that they can be positioned in the proper location for different boats having different lateral dimensions.

Figure 4:
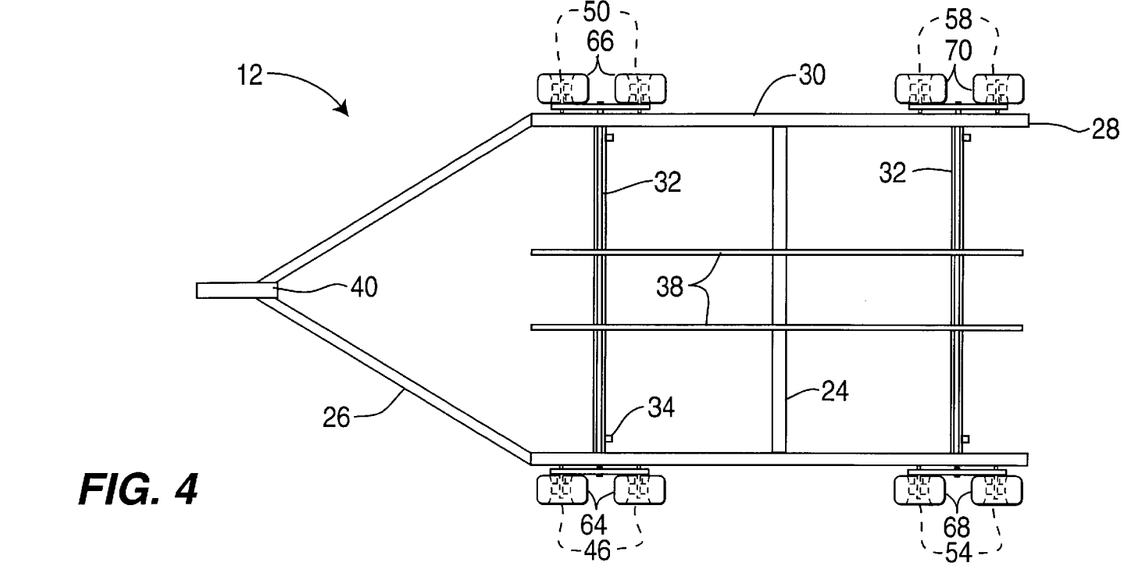
FIG. 4 is a top plan view of an alternative embodiment of the retriever lift of the present invention showing an embodiment including the bow stop and the hull support members.
Figure 5:
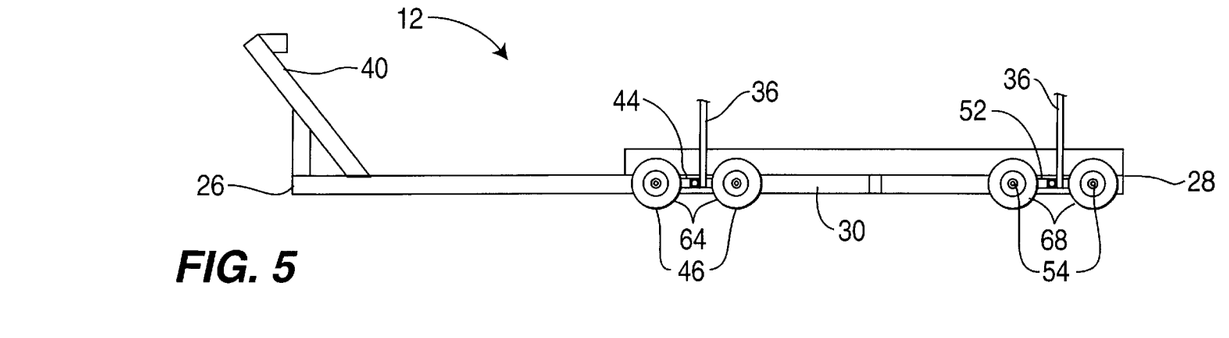
FIG. 5 is a side plan view of the embodiment shown in FIG. 4.

Also to facilitate support of the hull of a watercraft 10 hull support member 38 can extend longitudinally generally parallel to the bunk members 30 and therebetween in order to support the hull of a watercraft 10 on both sides thereof to facilitate fixed securement thereof to the retriever lift 12 during movement. In a similar manner a bow stop 40 can be positioned adjacent the bow of a watercraft 10 when positioned securely upon the carrier frame 24 is such a manner that the bow will abut the bow stop 40 and further secure. the watercraft 10 as desired.

The carrier frame 24 will preferably be supported by an articulated suspension means which will preferably include a plurality of articulating arm members and axle members with wheels secured thereto. In the preferred configuration the articulated suspension means 42 will include a first articulating arm member 44 pivotally movable with respect to the carrier frame 24 with first axle members 46 extending outwardly laterally therefrom. A pair of first wheel means 64 will be positionable rotatably on the first axle members 46 to provide the articulated structure. In the preferred configuration each wheel of the pair of wheels 64 will be positioned on first axle members 46 on each opposite side of the point of pivotal securement of the first articulating arm member 44 with respect to the carrier frame 24.

In a similar configuration a second articulating arm member 48 will be rotatably mounted preferably on the opposite side of the carrier frame 24 from the first articulating arm member 44 and will extend longitudinally with respect to the carrier frame 24 with second axle members 50 extending outwardly therefrom. A second pair of wheels 66 will be pivotally mounted on the second axle members 50 to form the articulated suspension member thereadjacent. In the preferred configuration two additional articulated constructions will be included rearwardly located from the first articulating arm member 44 and the second articulating arm member 48. This construction will include a third articulating arm member 52 and a fourth articulating arm member 56. Each will extend longitudinally along the carrier frame 24 near the second end 28 thereof and on opposite sides of the carrier frame 24. Third articulating arm member 52 will include third axle members 54 extending outwardly therefrom with a third pair of wheels 68 rotatably mounted thereto. In a similar manner the fourth articulating arm member 56 will include fourth axle members 58 extending outwardly therefrom with a fourth pair of wheels 70 rotatably mounted thereto.

The construction of the wheel means 60 of the present invention will preferably be at least partially hydraulic and also partially pneumatic. That is, by the introduction of water as the inflatable into the inflatable wheels 60, the wheels will be significantly weighted to allow the carrier frame 24 to travel upon the ground line overland when moving between the first and second positions 16 and 18. While moving toward the second position 18 the carrier frame 24 will move below the water line which would provide a difficulty if the wheel means 60 were fully buoyant. If they were buoyant it is possible with certain types of watercraft that the carrier frame 24 would float on the water line and not travel along the overland area 14. This would significantly impact the efficient operation of the retriever lift 12 of the present invention and, for this reason, all of the wheels 60 including the first, second, third and fourth pair of wheels 64, 66, 68 and 70 all should be adapted to receive a ballast material therein which could be water and in which case would be hydraulic with the remaining portion of the inflatable area filled with air. Alternatively this could be filled with sand or other ballast to maintain contact of the wheels 60 with respect to the river bottom or ocean bottom of the adjacent body of water.

Movement between the first position 16 and the second position 18 is achieved by the positioning of the continuous longitudinal means 72. This continuous longitudinal means preferably is formed as a cable but it could be a chain or other longitudinally somewhat flexible member. A winch 74 is positioned as shown in FIG. 1 attached to the first deadman fixed member 20 in this specific preferred embodiment.

Figure 1:
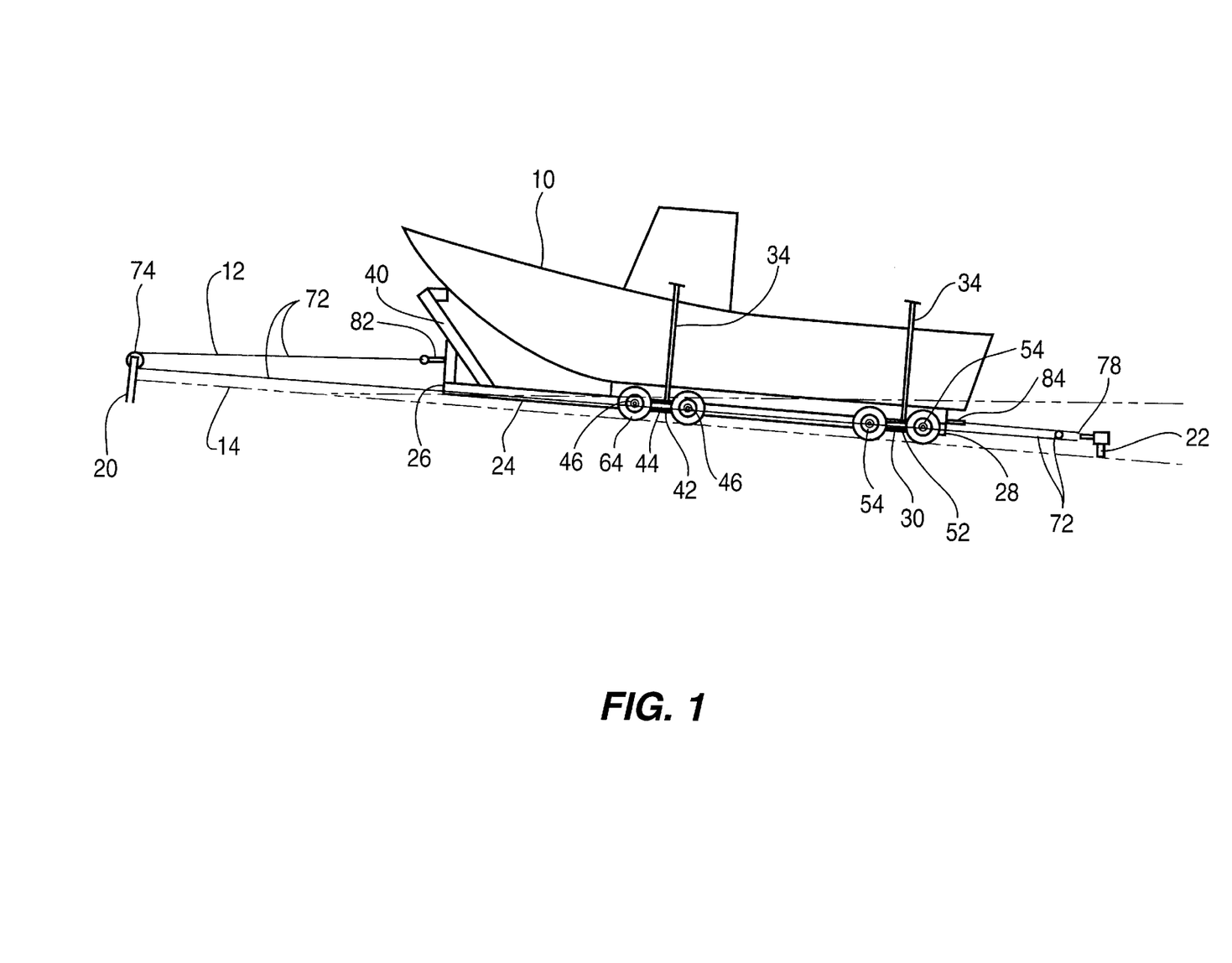
FIG. 1 is a side plan view of the preferred embodiment of the watercraft retriever lift of the present invention.
Figure 6:
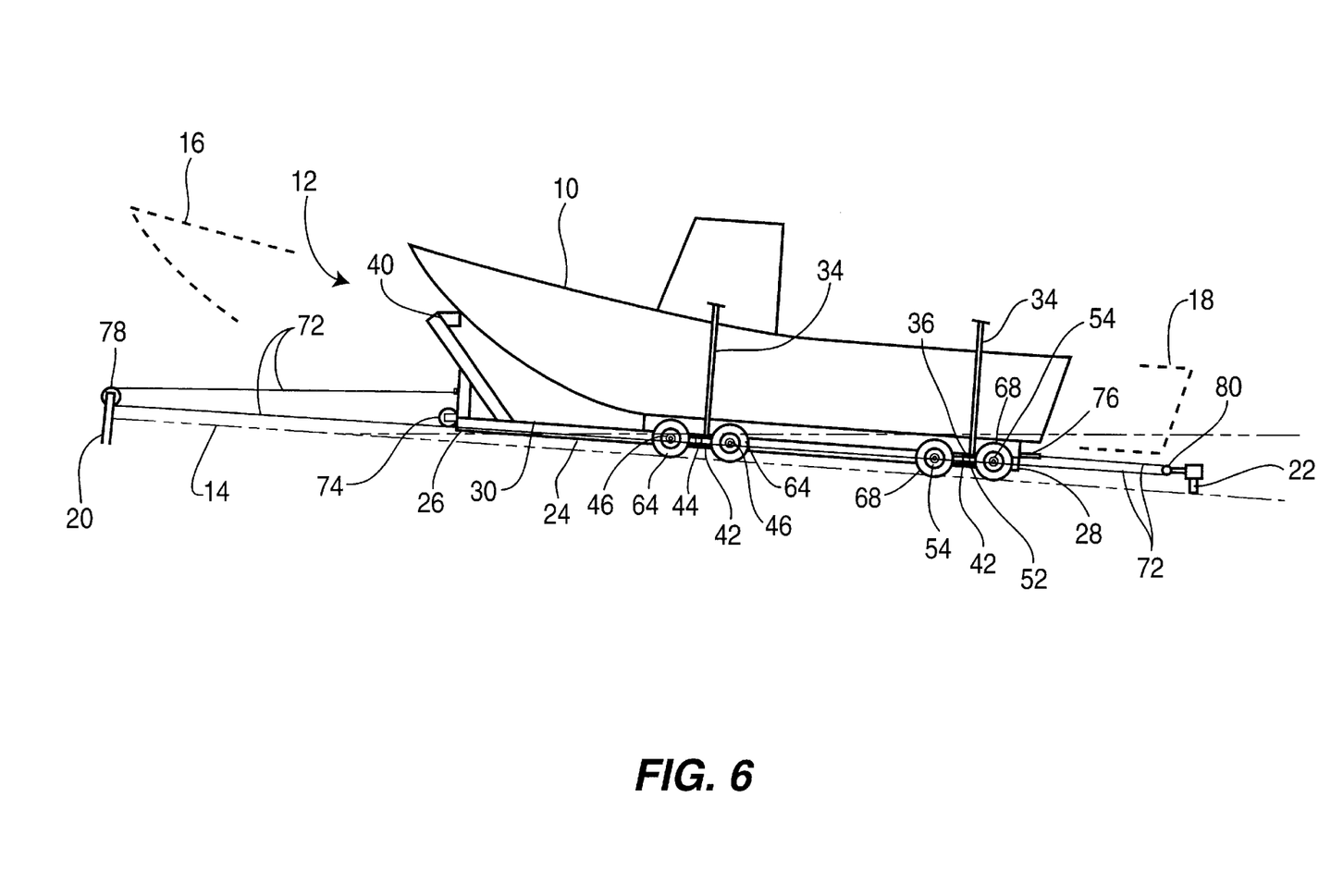
FIG. 6 is a side plan view of an alternative embodiment of the retriever lift of the present invention.

It should be appreciated that the continuous longitudinal cable or chain 72 will extend from the first end 26 of carrier frame 24 to the first deadman fixed member 20 and back toward the carrier frame 24 such that it extends along the carrier frame beneath a watercraft 10 positioned thereon again past the first end 26 thereof and then on further to the right as shown in FIG. 1 past the second end 28 thereof to the position of the second deadman fixed member 22. Continuous member 72 will then extend from the second deadman fixed member 22 to the back of the carrier frame 24 to be attached with respect thereto. In this manner the continuous longitudinal member 78 will extend continuously from the front or first end 26 of the carrier frame to the back or second end 28 of the carrier frame 24 without any engagement whatsoever with respect to the carrier frame itself in order to facilitate complete and maintenance-free control thereof. Powering of the winch will cause the continuous longitudinal member 72 to be drawn in, in the upper portion on the left of FIG. 1, and allowed to extend outward in the lower portion which would achieve movement of the watercraft 10 to the first dry dock position 16. Alternatively the operation of the winch in the opposite direction would cause the cable to be extended out in the upper portion of the left area of FIG. 1 and pulled in the lower portion which would cause the watercraft 10 and the retriever lift 12 to move toward the second position 18 in the adjacent water. Sheaves can be included mounted with respect to either the first deadman or the second deadman to facilitate pivoting of the continuous longitudinal means 72 there around. A first sheave means 78 may be secured to the first deadman fixed member 20 as shown in FIG. 6 and a second sheave 80 can be secured to the second deadman fixed member 22 as shown in FIGS. 1 and 6. The positioning of the winch 74 can vary and two examples of this positioning are shown in FIGS. 1 and 6. In FIG. 1 the winch 74 is secured to the first deadman fixed member 20 whereas in FIG. 6 the winch 74 is secured to the first end 26 of the carrier frame 24. Other positions are possible and may include usage of one or both of the first and second sheaves 78 and 80 as described above. The longitudinal tension of the continuous longitudinal means 72 is an extremely important parameter of this invention and in order to control this tension a first tensioning means 82 may be included positioned between the continuous longitudinal means 72 and the first end 26 of carrier frame 24. To further facilitate adjustment and positioning a second tensioning means 84 can be included between the continuous longitudinal cable or chain 72 and the second end 28 of the carrier frame 24.

The configuration shown in FIG. 6 operates almost identically to the configuration shown in FIG. 1. However the winch 74 in FIG. 1 is attached to the first deadman fixed member 20 whereas in the alternative configuration shown in FIG. 6 the winch 74 is attached to the first end 26 of carrier frame 24.

The operation of the winch 74 in the counterclockwise direction in FIG. 1 is described here above wherein it is shown to be capable of moving the carrier frame 24 toward the first deadman 20 by wrapping up the portion of the continuous longitudinal member 72 extending toward the first end 26 of carrier frame 24 and letting out the portion of the longitudinal member extending there below from the winch 74 toward the second deadman fixed member 22. The opposite rotational movement of the winch 74 clockwise will cause similar but opposite movement to allow the carrier frame 24 to move downwardly toward the second deadman fixed member 22.

In a similar manner the winch 74 of FIG. 6 is operable. Winch 74 in embodiment shown in FIG. 6 when rotating in the counterclockwise direction will draw into it the portion of the continuous longitudinal means 72 extending to the left therefrom while simultaneously letting out from the winch 74 the portion of the continuous longitudinal means 72 which extends to the right from winch 74 extending freely along the carrier frame 24 to the second deadman fixed member 22. In this manner the carrier frame 24 will be drawn toward the first deadman member.

Opposite rotation of the winch 74 in the clockwise direction will let out the section of the continuous longitudinal means 72 extending to the left therefrom as shown in FIG. 6 and will draw in the section of the continuous longitudinal means 72 as extending to the right of the winch 74 in FIG. 6 causing the carriage frame 24 to move over land toward the second deadman fixed member 22. Thus we can see that the operation of the winch 78 is extremely similar regardless of whether the winch is mounted to the first end 26 of the carrier frame 24 as shown in FIG. 6 or if the winch 74 is mounted to the first deadman fixed member 20 as shown in the FIG. 1 configuration.

The individual first deadman fixed member 20 and second deadman fixed member 22 can be environmental structure such as piers and the like which may already be existing at the site or they can be sold with the retriever lift 12 apparatus of the present invention. It should be appreciated that the movement of the carrier frame 24 when supported by numerous articulated wheels is a very steady slow secure type movement which is desirable for movement of such watercraft 10 which are often very expensive and difficult to move. Heretofore use of such wheels has been found difficult. However, by including semi-pneumatic tires which are designed to receive water or sand, this will assure that the retriever lift 12 moves along the overland area 14 thereby eliminating problems of the prior art.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A watercraft retriever lift adapted to move a watercraft overland while directly positioned in abutment with the contour of the land surface located between a first deadman fixed member and a second deadman fixed member comprising:

A. a carrier frame means for supporting a watercraft thereon to facilitate moving of the watercraft overland between a first position adjacent the first deadman fixed member and a second position adjacent the second deadman fixed member, said carrier frame means including a first end means and a second end means spatially disposed apart from one another, said first end means being closer than said second end means to the first deadman fixed member and said second end means being closer than said first deadman member to said second deadman fixed member;

B. an articulated suspension means attached to said carrier frame means to facilitate ease of movement thereof over the land surface contour between said first deadman fixed member and said second deadman fixed member with a watercraft thereupon, said articulated suspension means including:

(1) an articulating arm member pivotally mounted with respect to said carrier frame means and extending longitudinally therealong, said articulating arm member being pivotally movable with respect to said carrier frame means with an axis of rotation oriented laterally with respect thereto;

(2) a plurality of axle members mounted in said articulating arm member to be movable therewith with respect to said carrier frame means and extending laterally outwardly therefrom to facilitate movement thereof relative to said carrier frame means to facilitate movement thereof following the land surface contour between said first deadman fixed member and said second deadman fixed member;

C. a plurality of wheel means rotatably secured to said axle members of said articulated suspension means to be movable therewith relative to said carrier frame means to facilitate movement of said carrier frame means and a watercraft supported thereon over varying land surface contours between said first dead man fixed member and said second dead man fixed member;

D. a continuous longitudinal means attached to said carrier frame means and extending between said first deadman fixed member and said second deadman fixed member to facilitate moving of said carrier frame means therebetween between the first position and the second position, said continuous longitudinal member being attached to said first end means and extending therefrom to attachment to the first deadman fixed member and extending therefrom to attachment to the second deadman fixed member and extending therefrom to attachment to said second end means; and E. a winch means operatively attached to said continuous longitudinal means to urge longitudinal movement thereof to cause movement of said carrier frame means and any watercraft supported thereupon between the first position and the second position, said continuous longitudinal means extending along said carrier frame means without any engagement therewith to freely extend directly from said winch means to said second deadman fixed member to facilitate movement of said carrier frame means relative to said second deadman fixed member as desired.

2. A watercraft retriever lift adapted to move a watercraft over while directly positioned in abutment with the contour of the land surface located between a first deadman fixed member and a second deadman fixed member as defined in claim 1 wherein said continuous longitudinal member comprises a cable means.

3. A watercraft retriever lift adapted to move a watercraft over while directly positioned in abutment with the contour of the land surface located between a first deadman fixed member and a second deadman fixed member as defined in claim 1 wherein said continuous longitudinal member comprises a chain means.

4. A watercraft retriever lift adapted to move a watercraft over while directly positioned in abutment with the contour of the land surface located between a first deadman fixed member and a second deadman fixed member as defined in claim 1 wherein said winch means is fixedly secured to said first end means of said carrier frame means and is operably attached to said continuous longitudinal member to move therealong urging movement of said carrier frame means selectively between the first position adjacent the first deadman fixed member and the second position adjacent the second deadman fixed member.

5. A watercraft retriever lift adapted to move a watercraft over while directly positioned in abutment with the contour of the land surface located between a first deadman fixed member and a second deadman fixed member as defined in claim 1 wherein said winch means is fixedly secured to the first deadman fixed member and is operatively attached to said continuous longitudinal member in order to cause longitudinal movement responsive to operation of said winch means to facilitate movement of said carrier frame means selectively between the first position adjacent the first deadman fixed member and the second position adjacent the second deadman fixed member.

6. A watercraft retriever lift adapted to move a watercraft over while directly positioned in abutment with the contour of the land surface located between a first deadman fixed member and a second deadman fixed member as defined in claim 1 further comprising a tension adjustment means positioned in longitudinal alignment with said continuous longitudinal means to facilitate adjusting of longitudinal length and tightness thereof.

7. A watercraft retriever lift adapted to move a watercraft over while directly positioned in abutment with the contour of the land surface located. between a first deadman fixed 6 member and a second deadman fixed member as defined in claim wherein said tension adjustment means is attached between said first end means of said carrier frame means and said continuous longitudinal member.

8. A watercraft retriever lift adapted to move a watercraft over while directly positioned in abutment with the contour of the land surface located between a first deadman fixed member and a second deadman fixed member as defined in claim 6 wherein said tension adjustment means is attached between said second end means of said carrier frame means and said continuous longitudinal member.

9. A watercraft retriever lift adapted to move a watercraft over while directly positioned in abutment with the contour of the land surface located between a first deadman fixed member and a second deadman fixed member as defined in claim 1 further comprising a first sheave means secured to the first deadman fixed member with said continuous longitudinal member extending there around and attached to said first end means of said carrier frame means.

10. A watercraft retriever lift adapted to move a watercraft over while directly positioned in abutment with the contour of the land surface located between a first deadman fixed member and a second deadman fixed member as defined in claim 1 further comprising a second sheave means secured to the second deadman fixed member with said continuous longitudinal member extending there around and attached to said second end means of said carrier frame means.

11. A watercraft retriever lift adapted to move a watercraft over while directly positioned in abutment with the contour of the land surface located between a first deadman fixed member and a second deadman fixed member as defined in claim 1 further comprising a first deadman fixed member positioned above water level and a second deadman fixed member positioned below water level to facilitate overland movement selectively of a watercraft between a body of water to a dry dock position.

12. A watercraft retriever lift adapted to move a watercraft over while directly positioned in abutment with the contour of the land surface located between a first deadman fixed member and a second deadman fixed member as defined in claim 1 wherein said wheel means includes a inflatable tire means being at least partially inflatable to facilitate movement of said carrier frame means between the first position and the second position.

13. A watercraft retriever lift adapted to move a watercraft over while directly positioned in abutment with the contour of the land surface located between a first deadman fixed member and a second deadman fixed member as defined in claim 12 wherein said inflatable tire means defines a ballast retaining chamber means therein to selectively receive weighted ballast therein in order to maintain contact between the inflatable tire means and the earthen substrate when moving overland through water covered areas.

14. A watercraft retriever lift adapted to move a watercraft over while directly positioned in abutment with the contour of the land surface located between a first deadman fixed member and a second deadman fixed member as defined in claim 13 wherein said ballast retaining chamber means is also adapted to receive pressurized gas therein to facilitate inflation of said inflatable tire means.

15. A watercraft retriever lift adapted to move a watercraft over while directly positioned in abutment with the contour of the land surface located between a first deadman fixed member and a second deadman fixed member as defined in claim 1 wherein said wheel means includes an hydraulic tire means being at least partially capable of receiving water therewith in to maintain inflation thereof to facilitate movement of said carrier frame means between the first position and the second position and to prevent floating of the watercraft retriever lift responsive to movement in water covered areas.

16. A watercraft retriever lift adapted to move a watercraft over while directly positioned in abutment with the contour of the land surface located between a first deadman fixed member and a second deadman fixed member as defined in claim 1 wherein said wheel means comprises:
   A. a first pair of wheels;
   B. a second pair of wheels;
   C. a third pair of wheels; and
   D. a fourth pair of wheels.

17. A watercraft retriever lift adapted to move a watercraft over while directly positioned in abutment with the contour of the land surface located between a first deadman fixed member and a second deadman fixed member as defined in claim 16 wherein said articulated suspension means includes:
   A. a first articulating arm member pivotally mounted with respect to said carrier frame means and extending longitudinally therealong, said first articulating arm member being pivotally movable with respect to said carrier with an axis of rotation oriented laterally with respect to said carrier frame means;
   B. a pair of first axle members mounted on said first articulating arm member and extending laterally outwardly therefrom spatially disposed from one another, said first axle members being adapted to receive said first pair of wheels rotatably mounted thereon to facilitate movement of said carrier frame means between said first position and said second position;
   C. a second articulating arm member pivotally mounted with respect to said carrier frame means and extending longitudinally therealong, said second articulating arm member being pivotally movable with respect to said carrier with an axis of rotation oriented laterally with respect to said carrier frame means;
   D. a pair of second axle members mounted on said second articulating arm member and extending laterally outwardly therefrom spatially disposed from one another, said second axle members being adapted to receive said second pair of wheels rotatably mounted thereon to facilitate movement of said carrier frame means between said first position and said second position;
   E. a third articulating arm member pivotally mounted with respect to said carrier frame means and extending longitudinally therealong, said third articulating arm member being pivotally movable with respect to said carrier with an axis of rotation oriented laterally with respect to said carrier frame means;
   F. a pair of third axle members mounted on said third articulating arm member and extending laterally outwardly therefrom spatially disposed from one another, said third axle members being adapted to receive said third pair of wheels rotatably mounted thereon to facilitate movement of said carrier frame means between said first position and said second position;
   G. a fourth articulating arm member pivotally mounted with respect to said carrier frame means and extending longitudinally therealong, said fourth articulating arm member being pivotally movable with respect to said carrier with an axis of rotation oriented laterally with respect to said carrier frame means; and
   H. a pair of fourth axle members mounted on said fourth articulating arm member and extending laterally outwardly therefrom spatially disposed from one another, said fourth axle members being adapted to receive said fourth pair of wheels rotatably mounted thereon to facilitate movement of said carrier frame means between said first position and said second position.

18. A watercraft retriever lift adapted to move a watercraft over while directly positioned in abutment with the contour of the land surface located between a first deadman fixed member and a second deadman fixed member as defined in claim 1 wherein said carrier frame means includes:
   A. bunk members extending longitudinally between said first end and said second end thereof and spatially disposed from one another; and
   B. cross beam members extending laterally between said bunk members to facilitating support of a watercraft supported thereupon.

19. A watercraft retriever lift adapted to move a watercraft over while directly positioned in abutment with the contour of the land surface located between a first deadman fixed member and a second deadman fixed member as defined in claim 18 wherein said articulated suspension means is pivotally attached with respect to said cross beam members to facilitate support of said carrier frame means.

20. A watercraft retriever lift adapted to move a watercraft over while directly positioned in abutment with the contour of the land surface located between a first deadman fixed member and a second deadman fixed member as defined in claim 18 wherein said carrier frame means further includes guide pole means extending vertically with respect to said carrier frame means to facilitate retaining of a watercraft thereupon.

21. A watercraft retriever lift adapted to move a watercraft over while directly positioned in abutment with the contour of the land surface located between a first deadman fixed member and a second deadman fixed member as defined in claim 20 wherein said carrier frame means further includes guide pole brackets adjustably mounting to said cross beam members with said guide pole means affixed thereto and extending vertically therefrom, said guide pole brackets being adjustable laterally along said cross beam members to provide adjustment in the lateral positioning thereof to facilitate retaining of variously sized watercraft thereupon.

22. A watercraft retriever lift adapted to move a watercraft over while directly positioned in abutment with the contour of the land surface located between a first deadman fixed member and a second deadman fixed member as defined in claim 18 wherein said carrier frame means includes a hull support members extending longitudinally generally perpendicularly with respect to said cross beam members to facilitate abutment with and supporting of the hull of a watercraft supported upon said carrier frame means.

23. A watercraft retriever lift adapted to move a watercraft over while directly positioned in abutment with the contour of the land surface located between a first deadman fixed member and a second deadman fixed member as defined in claim 1 wherein said carrier support means includes a bow stop means adjacent said first end means thereof for abutment with a bow of a watercraft responsive to being positioned upon said carrier frame means.

24. A watercraft retriever lift adapted to move a watercraft over while directly positioned in abutment with the contour of the land surface located between a first deadman fixed member and a second deadman fixed member comprising:
   A. a carrier frame means for supporting a watercraft thereon to facilitate moving of the watercraft overland between a first position adjacent the first deadman fixed member and a second position adjacent the second deadman fixed member, said carrier frame means including:
      (1) a first end means;
      (2) a second end means spatially disposed apart from said first ends means in the direction toward the second position, said first end means being closer than said second end means to the first deadman fixed member and said second end means being closer than said first deadman member to said second deadman fixed member;
      (3) bunk members extending longitudinally between said first end and said second end thereof and spatially disposed from one another;
      (4) cross beam members extending laterally between said bunk members to facilitating support of a watercraft thereupon;
      (5) guide pole means extending vertically with respect to said cross beam members to facilitate retaining of a watercraft thereupon;
      (6) guide pole brackets adjustably mounted to said cross beam members with said guide pole means affixed thereto and extending vertically therefrom, said guide pole brackets being adjustable laterally along said cross beam members to provide adjustment in the lateral positioning thereof to facilitate retaining of variously sized watercraft thereupon;
   B. an articulated suspension means attached to said carrier frame means to facilitate ease of movement thereof over the land surface contour between said first dead man fixed member and said second deadman fixed member with a watercraft thereupon, said articulated suspension means being pivotally attached with respect to said cross beam members to facilitate support of said carrier frame means and a watercraft positioned thereupon, said articulated suspension means including:
      (1) an articulating arm member pivotally mounted with respect to said carrier frame means and extending longitudinally therealong, said articulating arm member being pivotally movable with respect to said carrier frame means with an axis of rotation oriented laterally with respect thereto;
      (2) a plurality of axle members mounted in said articulating arm member to be movable therewith with respect to said carrier frame means and extending laterally outwardly therefrom;
   C. a plurality of wheel means rotatably secured to said articulating arm member of said articulated suspension means to facilitate movement of said carrier frame means and a watercraft supported thereon over various different land surface contours between said first dead man fixed member and said second dead. man fixed member, said wheel means including a tire means defining a ballast retaining chamber means therein to selectively receive weighted ballast therein in order to maintain contact between said tire means and the earthen substrate when moving overland through water covered areas;
   D. a continuous longitudinal means comprising a cable means attached to said carrier frame means and extending between said first deadman fixed member and said second deadman fixed member to facilitate moving of said carrier frame means therebetween between the first position and the second position, said continuous longitudinal member being attached to said first end means and extending therefrom to attachment to the first deadman fixed member and extending therefrom to attachment to the second deadman fixed member and extending therefrom to attachment to said second end means;
   E. a winch means operatively attached to said continuous longitudinal means to urge longitudinal movement thereof to cause movement of said carrier frame means and any watercraft supported thereupon between the first position and the second position, said winch means being fixedly secured to said first end means of said carrier frame means and being operably attached to said continuous longitudinal member to move therealong urging movement of said carrier frame means selectively between the first position adjacent the first deadman fixed member and the second position adjacent the second deadman fixed member, said continuous longitudinal means extending along said carrier frame means without any engagement therewith to freely extend directly from said winch means to said second deadman fixed member to facilitate movement of said carrier frame means relative to said second deadman fixed member as desired;
   F. a tension adjustment means positioned in longitudinal alignment with said continuous longitudinal means to facilitate adjusting of longitudinal length and tightness thereof; and
   G. a sheave means secured to the second deadman fixed member with said continuous longitudinal member extending there around and attached to said second end means of said carrier frame means.

25. A watercraft retriever lift adapted to move a watercraft over while directly positioned in abutment with the contour of the land surface located between a first deadman fixed member and a second deadman fixed member comprising:
   A. a first deadman fixed member positioned above water level and a second deadman fixed member positioned below water level to facilitate overland movement selectively of a watercraft between a body of water and a dry dock position;
   B. a carrier frame means for supporting a watercraft thereon to facilitate moving of the watercraft overland between a first position adjacent the first deadman fixed member and a second position adjacent the second deadman fixed member, said carrier frame means including:
(1) a first end means;
(2) a second end means spatially disposed apart from said first ends means in the direction toward the second position, said first end means being closer than said second end means to the first deadman fixed member and said second end means being closer than said first deadman member to said second deadman fixed member;
(3) bunk members extending longitudinally between said first end and said second end thereof and spatially disposed from one another;
(4) cross beam members extending laterally between said bunk members to facilitating support of a watercraft thereupon;
(5) guide pole means extending vertically with respect to said cross beam members to facilitate retaining of a watercraft thereupon;
(6) guide pole brackets adjustably mounted to said cross beam members with said guide pole means affixed thereto and extending vertically therefrom, said guide pole brackets being adjustable laterally along said cross beam members to provide adjustment in the lateral positioning thereof to facilitate retaining of variously sized watercraft thereupon;
(7) hull support members extending longitudinally generally perpendicularly with respect to said cross beam members to facilitate abutment with and supporting of the hull of a watercraft positioned upon said carrier frame means;
(8) a bow stop means adjacent said first end means for abutment with a bow of a watercraft responsive to being positioned upon said carrier frame means;

C. an articulated suspension means attached to said carrier frame means to facilitate ease of movement thereof over the land surface contour between said first dead man fixed member and said second deadman fixed member with a watercraft thereupon, said articulated suspension means being pivotally attached with respect to said cross beam members to facilitate support of said carrier frame means and a watercraft positioned thereupon,
(1) a first articulating arm member pivotally mounted with respect to said carrier frame means and extending longitudinally therealong, said first articulating arm member being pivotally movable with respect to said carrier with an axis of rotation oriented laterally with respect to said carrier frame means;
(2) a pair of first axle members mounted on said first articulating arm member and extending laterally outwardly therefrom spatially disposed from one another;
(3) a second articulating arm member pivotally mounted with respect to said carrier frame means and extending longitudinally therealong, said second articulating arm member being pivotally movable with respect to said carrier with an axis of rotation oriented laterally with respect to said carrier frame means;
(4) a pair of second axle members mounted on said second articulating arm member and extending laterally outwardly therefrom spatially disposed from one another;
(5) a third articulating arm member pivotally mounted with respect to said carrier frame means and extending longitudinally therealong, said third articulating arm member being pivotally movable with respect to said carrier with an axis of rotation oriented laterally with respect to said carrier frame means;
(6) a pair of third axle members mounted on said third articulating arm member and extending laterally outwardly therefrom spatially disposed from one another;
(7) a fourth articulating arm member pivotally mounted with respect to said carrier frame means and extending longitudinally therealong, said fourth articulating arm member being pivotally movable with respect to said carrier with an axis of rotation oriented laterally with respect to said carrier frame means; and
(8) a pair of fourth axle members mounted on said fourth articulating arm member and extending laterally outwardly therefrom spatially disposed from one another;

D. a wheel means rotatably secured to said articulated suspension means to facilitate movement of said carrier frame means and a watercraft supported thereon over various different land surface contours between said first dead man fixed member and said second dead man fixed member, said wheel means including an hydraulic tire means defining a ballast retaining chamber means therein to selectively receive weighted ballast therein in order to maintain contact between said tire means and the earthen substrate when moving overland through water covered areas, said hydraulic tire means being at least partially capable of receiving water therewith in to maintain inflation thereof to facilitate movement of said carrier frame means between the first position and the second position and to prevent floating of the watercraft retriever lift responsive to movement in water covered areas, said wheel means comprising:
(1) a first pair of wheels rotatably mounted on said first axle members to facilitate movement of said carrier frame means between said first position and said second position;
(2) a second pair of wheels rotatably mounted on said second axle members to facilitate movement of said carrier frame means between said first position and said second position;
(3) a third pair of wheels rotatably mounted on said third axle members to facilitate movement of said carrier frame means between said first position and said second position;
(4) a fourth pair of wheels rotatably mounted on said fourth axle members to facilitate movement of said carrier frame means between said first position and said second position;

E. a continuous longitudinal means comprising a cable means attached to said carrier frame means and extending between said first deadman fixed member and said second deadman fixed member to facilitate moving of said carrier frame means therebetween between the first position and the second position, said continuous longitudinal member being attached to said first end means and extending therefrom to attachment to the first deadman fixed member and extending therefrom to attachment to the second deadman fixed member and extending therefrom to attachment to said second end means;

F. a winch means operatively attached to said continuous longitudinal means to urge longitudinal movement thereof to cause movement of said carrier frame means and any watercraft supported thereupon between the first position and the second position, said winch means being fixedly secured to the first deadman fixed member and being operatively attached to said continuous longitudinal member in order to cause longitudinal movement responsive to operation of said winch means to facilitate movement of said carrier frame means selectively between the first position adjacent the first deadman fixed member and the second position adjacent the second deadman fixed member, said continuous longitudinal means extending along said carrier frame means without any engagement therewith to freely extend directly from said winch means to said second deadman fixed member to facilitate movement of said carrier frame means relative to said second deadman fixed member as desired;

G. a tension adjustment means positioned in longitudinal alignment with said continuous longitudinal means to facilitate adjusting of longitudinal length and tightness thereof; and H. a sheave means secured to the second deadman fixed member with said continuous longitudinal member extending there around and attached to said second end means of said carrier frame means.

* * * * *